United States Patent Office 3,637,669
Patented Jan. 25, 1972

3,637,669
NITRO DYESTUFFS
Ruedi Altermatt, Tecknau-Basel, Switzerland, assignor to Sandoz Ltd. (also known as Sandoz A.G.), Basel, Switzerland
No Drawing. Filed Oct. 28, 1968, Ser. No. 771,372
Claims priority, application Switzerland, Nov. 17, 1967, 16,140/67
Int. Cl. C07d 15/04
U.S. Cl. 260—239.6                          10 Claims

ABSTRACT OF THE DISCLOSURE

This invention relates to disperse dyes of the nitro series which are substituted by a radical of formula $$-O-CH_2-O-CH_2-$$

and are very suitable for dyeing and printing of fibres and fibre materials made of fully synthetic or semisynthetic, hydrophobic, high molecular organic substances.

---

The new dyes are of the formula $$R_1-\underset{R_2}{\langle A \rangle}-NH-\underset{NO_2}{\langle\ \rangle}-R_4 \qquad (I)$$

wherein $R_1$ stands for a hydrogen or halogen atom or a hydroxyl, nitro, cyano, alkyl, alkoxy, phenoxy, acylamino or acyl group of together with $R_2$ for a bridge member of the formula $-O-CH_2-O-CH_2-$, $R_2$ for a hydrogen or halogen atom or a cyano, nitro, alkyl, alkoxy, phenoxy, acyl or acylamino group, or together with $R_1$ for a bridge member of the formula $$-CH_2-O-CH_2-O-$$

$R_3$ for a halogen atom or a cyano, nitro or acyl group or a radical of the formula $$-Y-NH-\underset{R_5}{\langle B \rangle}-R_4 \qquad (II)$$

$R_4$ for a hydrogen or hydrogen atom or an alkyl, alkoxy, acylamino or carboxylic acid ester group or together with $R_5$ for a bridge member of the formula $$-O-CH_2-O-CH_2-,$$

$R_5$ for a hydrogen atom together with $R_4$ for a bridge member of the formula $-CH_2O-CH_2-O-$, and Y for a group of the formula $-CO-$ or $-SO_2-$ at least one of the nuclei A and B is substituted by a group of the formula $-CH_2-O-CH_2-O-$ and the molecule may bear further substituents with the exception of sulphonic acid groups.

The alkyl and alkoxy groups all contain preferably 1, 2, 3 or 4 carbon atoms and as substituents may bear for example halogen atoms, in particular chlorine or bromine atoms, hydroxyl, cyano, alkoxy phenyl, phenoxy, acyl or acyloxy groups.

The phenyl nuclei of the molecule, besides the aforenamed substituents, may contain halogen atoms, in particular chlorine or bromine atoms, hydroxyl, alkyl, alkoxy, cyano, nitro, acyl, acyloxy or acylamino groups as further substituents.

Alkoxycarbonyl groups, in particular methoxycarbonyl groups, are preferred carboxylic acid ester groups.

The acyl groups may be of the formula R'—X— or R''—W— where R' stands for a hydrocarbon radical which may bear non-water-solubilizing substituents and/or hetero atoms, preferably an optionally substituted alkyl or phenyl radical such as the aforementioned, X for a radical of the formula —O—CO— or —SO$_2$—, R'' for a hydrogen atom, cyclohexyl or R', W for a radical of the formula —CO—, —NR'''—CO— or $$-NR'''-SO_2-$$

and R''' for a hydrogen atoms or R'.

Examples of preferred substituents on the bridge members of the formula —O—CH$_2$—O—CH$_2$— are methyl or trichloromethyl radicals.

A number of the preferred dyes of this invention are of the formula $$R_9-\overset{R_6}{\underset{O}{CH}}\overset{R_7}{\underset{R_8}{CH}}-O-\langle\ \rangle-NH-\underset{NO_2}{\langle\ \rangle}-R_{10} \qquad (III)$$

where $R_6$ stands for a hydrogen, chlorine or bromine atom or an alkyl group; $R_7$ for a hydrogen, chlorine or bromine atom or an alkyl or alkoxy group; $R_8$ and $R_9$ independently of each other, for a hydrogen atom or an alkyl group which may be substituted by fluorine, chlorine or bromine atoms; and $R_{10}$ for a chlorine or bromine atom or a cyano, nitro, alkylcarbonyl, alkoxycarbonyl, benzoyl, aminocarbonyl, alkylsulphonyl, phenylsulphonyl or aminosulphonyl group; the alkyl groups may all be substituted by chorine or bromine atoms, hydroxy, alkoxy, phenyl, phenyloxy or cyano groups, the phenyl radicals may be substituted by chlorine or bromine atoms, alkyl, alkoxy, nitro, cyano, acylamino phenyl or phenyloxy groups, and the amino groups by alkyl or phenyl radicals.

Other preferred dyes are of the formula $$R_{14}-\langle\overset{R_6\ R_7}{\ }\rangle-NH-\langle\overset{\ }{\underset{NO_2}{R_{13}}}\rangle-Y-NH-\langle\overset{R_{12}\ R_{11}}{\ }\rangle-\overset{O}{\underset{\overset{|}{R_8}}{\underset{CH-O}{CH-R_9}}} \qquad (IV)$$

where $R_6$, $R_7$, $R_8$ and $R_9$ have the aforestated meanings; $R_{11}$ stands for a hydrogen, chlorine or bromine atom or an alkyl group; $R_{12}$, for a hydrogen, chlorine or bromine atom or an alkyl group; $R_{13}$, for a hydrogen or halogen atom, a nitro, cyano, alkoxy, acylamino or carboxylic acid ester group or, together with $R_{14}$, for a bridge member of the formula $$-\underset{R_9}{\overset{|}{CH}}-O-\underset{R_9}{\overset{|}{CH}}-O- \qquad (V)$$

and $R_{14}$, for a hydrogen or halogen atom or a hydroxyl, alkyl, alkoxy, cyano, nitro, alkylcarbonyl, alkylsulphonyl, phenylmethylsulphonyl, phenylethylsulphonyl, alkoxycarbonyl, phenylcarbonyl, phenoxycarbonyl, aminocarbonyl, acylamino or aminosulphonyl group or, together with $R_{13}$, for a group of Formula V; the alkyl groups may be substituted by chlorine or bromine atoms, hydroxyl, alkoxy, phenoxy or cyano groups, the phenyl groups by halogen atoms, cyano, nitro, alkyl, alkoxy, phenyl or phenyloxy groups, and the amino groups by alkyl or phenyl radicals.

The new dyes of Formula I are produced by reacting an amine of the formula

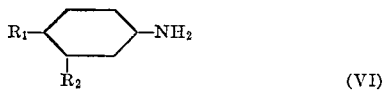

(VI)

with a compound of the formula

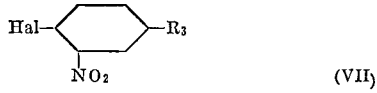

(VII)

where Hal represents a chlorine or bromine atom.

The reaction of a compound of Formula VI with a compound of Formula VII is generally effected in the temperature range of 25° to 200° C., depending on the reactivity of the halogen atom, either in water or in an organic solvent e.g. ethanol, n-butanol, benzylalcohol, ethylene glycol, polyethylene glycol, benzene, toluene, etc. It is usually of advantage to add an acid-binding agent to the reaction mixture, e.g. sodium acetate, sodium carbonate or bicarbonate, or magnesium oxide.

Compounds of Formula I in which $R_3$ represents a radical of Formula II are obtainable by reacting 1 mole of a compound of the formula

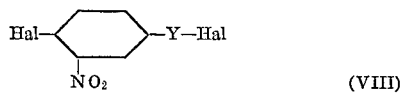

(VIII)

with 1 mole of an amine of the formula

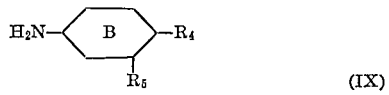

(IX)

and then reacting the product with 1 mole of an amine of Formula VI. The reaction conditions are generally the same as given in the foregoing.

Compounds of Formula I in which $R_3$ is a radical of Formula II can alternatively be produced by reacting 1 mole of a compound of the formula

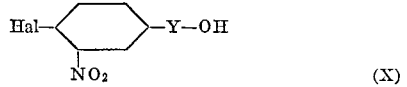

(X)

with 1 mole of an amine of Formula VI, e.g. under the aforestated conditions, halogenating the resulting compound to a compound of the formula

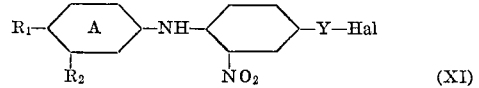

(XI)

and reacting this compound with an amine of Formula IX, again under the aforestated conditions.

Halogenation is carried out preferably in an inert solvent, e.g. carbon tetrachloride or carbon disulphide, using either phosphorus trichloride or, in the absence of solvent, thionyl chloride.

It is desirable to convert the new dyes into dye preparations before use, using for this purpose one of the known methods, for example grinding in the presence of dispersing agents and/or fillers, with subsequent drying. On the addition of a suitable volume of water the dye preparations can be applied to the fibre by exhaustion dyeing, pad dyeing or printing methods.

From aqueous dispersion the dyes build up excellently on semi-synthetic and synthetic fibres of hydrophobic character and high molecular weight. They are particularly suitable for the exhaustion dyeing, pad dyeing and printing of linear aromatic polyester, cellulose diacetate, cellulose triacetate and polyamide fibres. Polyolefine fibres also are dyeable with these dyes.

The known dyeing and printing methods are employed, for example that described in French Pat. 1,445,371. The dyeings and prints obtained are of yellow shade and have very good fastness properties, being outstandingly fast to thermo-fixation, sublimation, pleating, ozone and gas fumes. The fastness to water, perspiration, washing and other wet tests is also very good; the reserve of wool and the light fastness are notable. The dyes are stable to the action of the different forms of permanent press finishing. They are stable to boiling and reduction at temperatures up to about 220° C. and particularly to 140° C., and withstand a wide range of acids and alkalis. These stability properties are not adversely affected by the liquor ratio or by the presence of dyeing accelerants. The dyeings and prints are not subject to catalytic fading to any appreciable degree, but fade tone-in-tone on exposure to light. In the following examples the parts are by weight and the temperatures in degrees centigrade.

EXAMPLE 1

A mixture of 15.1 parts of 6-amino-1,3-benzodioxine, 31.3 parts of 1-chloro-2-nitrobenzene-4-sulphonic acid phenylamide, 120 parts of ethylene glycol and 9.2 parts of anhydrous sodium acetate is raised to 130° in 30 minutes with vigorous stirring and stirred further for 30 minutes at 130–135°, on which it is allowed to cool to about 70° as it is then difficult to stir. At the latter temperature it is diluted with 80 parts of methanol, and the dye formed is filtered off, washed with a little methanol and then with water, and finally dried. This dye gives dyeings of yellow shade on synthetic fibres which have excellent fastness properties.

EXAMPLE 2

A mixture of 9.3 parts of aminobenzene, 37 parts of the compound of the formula

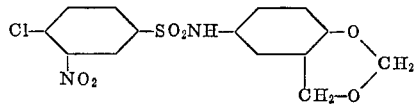

200 parts of ethylene glycol and 9.2 parts of anhydrous sodium acetate is raised over 30 minutes to 130° with thorough stirring and is stirred further at 130–135° for 30 minutes. After this time the mixture is allowed to cool to room temperature, at which the dye settles out in the form of fine needles. It is filtered off, washed with a little ethanol and then with water and dried. The dye thus obtained dyes synthetic fibres in yellow shades having excellent fastness properties.

EXAMPLE 3

A mixture of 25.6 parts of 1-chloro-2-nitrobenzene-4-sulphonic acid chloride, 30.2 parts of 6-amino-1,3-benzodioxine, 120 parts of ethylene glycol and 20 parts of anhydrous sodium acetate is brought to 40° over 30 minutes and over the next 30 minutes the temperature is increased to 150–155°. The reaction mixture is then allowed to cool to 70°, diluted with 100 parts of ethanol and allowed to cool further to room temperature. The dye settles out and is filtered off, washed with a little ethanol and then with hot water and dried. On synthetic fibres this dye gives dyeings of yellow shade and excellent fastness.

The dyes set out in the following table can be produced in accordance with the procedures given above. They are of the formula

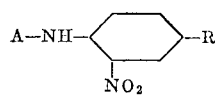

| Example No. | A | R | Shade on polyester fibre |
|---|---|---|---|
| 4 | Br—C$_6$H$_4$— | SO$_2$NH—C$_6$H$_3$(CH$_3$)—O—CH$_2$—O—CH$_2$ (1,3-dioxolane fused) | Yellow. |
| 5 | C$_6$H$_5$— | SO$_2$NH—C$_6$H$_3$—O—CH(CCl$_3$)—O—CH(CCl$_3$) | Do. |
| 6 | Same as above | SO$_2$NH—C$_6$H$_3$(Br)—O—CH(CCl$_3$)—O—CH(CCl$_3$) | Do. |
| 7 | do | SO$_2$NH—C$_6$H$_2$(Cl)(CH$_2$—)—O—CH$_2$—O | Do. |
| 8 | Cl—C$_6$H$_4$— | SO$_2$NH—C$_6$H$_2$(Br)(CH$_2$—)—O—CH$_2$—O | Do. |
| 9 | CH$_2$—O—C$_6$H$_3$—O—CH$_2$ | —SO$_2$NH—C$_6$H$_4$—NH—CO—CH$_3$ | Do. |
| 10 | CH$_3$COHN—C$_6$H$_4$— | SO$_2$NH—C$_6$H$_3$—O—CH$_2$—O—CH$_2$ | Do. |
| 11 | C$_6$H$_4$—NHCOCH$_3$ | Same as above | Do. |
| 12 | CH$_3$OCOHN—C$_6$H$_4$— | do | Do. |
| 13 | CH$_2$—O—C$_6$H$_3$—O—CH$_2$ | —SO$_2$CH$_2$—C$_6$H$_5$ | Do. |
| 14 | Same as above | —SO$_2$NH—C$_6$H$_3$(Cl)—O—CH$_2$—O—CH$_2$ | Do. |
| 15 | do | —Cl | Do. |
| 16 | do | —CN | Do. |
| 17 | do | —SO$_2$CH$_3$ | Do. |
| 18 | do | —SO$_2$CH$_2$CH$_3$ | Do. |
| 19 | do | —NO$_2$ | Do. |
| 20 | do | —COCH$_3$ | Do. |
| 21 | do | —COOCH$_3$ | Do. |
| 22 | do | —COOCH$_2$—C$_6$H$_5$ | Do. |
| 23 | do | —SO$_2$NH$_2$ | Do. |
| 24 | do | —SO$_2$NHCH$_3$ | Do. |
| 25 | do | —SO$_2$N(CH$_3$)$_2$ | Do. |
| 26 | do | —CONH$_2$ | Do. |
| 27 | do | —CONHCH$_3$ | Do. |
| 28 | do | —CONHCH$_2$CH$_3$ | Do. |
| 29 | do | —CON(CH$_3$)$_2$ | Do. |

| Example No. | A | R | Shade on polyester fibre |
|---|---|---|---|
| 30 | 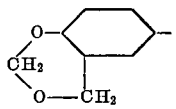 | 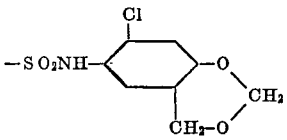 | Yellow. |
| 31 | 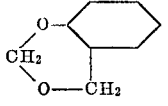 | —SO₂NHCH₂CH₂OCH₃ | Do. |
| 32 | Same as above | 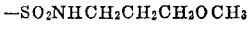 | Do. |
| 33 | 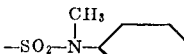 | 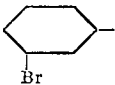 | Do. |
| 34 | 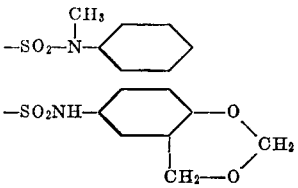 | Same as above | Do. |
| 35 | 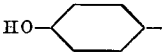 | 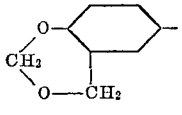 | Do. |
| 36 | Same as above | 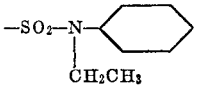 | Do. |
| 37 | do | 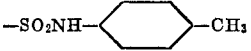 | Do. |
| 38 | do | 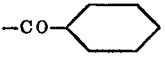 | Do. |
| 39 | do | —CON(CH₂CH₂CN)₂ | Do. |
| 40 | do | 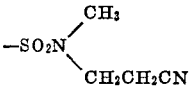 | Do. |
| 41 | 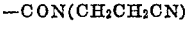 | 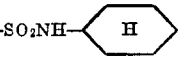 | Do. |
| 42 |  | Same as above | Do. |
| 43 | 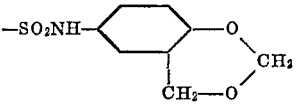 | do | Do. |
| 44 |  | do | Do. |
| 45 |  | do | Do. |
| 46 |  | do | Do. |
| 47 | 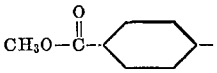 | do | Do. |
| 48 |  | do | Do. |
| 49 |  | 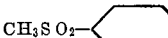 | Do. |

| Example No. | A | R | Shade on polyester fibre |
|---|---|---|---|
| 50 | Cl₃C—CH(O—)(O—CH)—cyclohexyl—, with CCl₃ and CH₃ substituents | —SO₂NHCH₂CH₂CH₂OCH₃ | Yellow. |
| 51 | CH₃O—, O—CH₂ on cyclohexyl | —SO₂NHCH₃ | Do. |
| 52 | CH₃, CH₃O—, O—CH₂ on cyclohexyl | —SO₂NH—C₆H₄—H | Do. |
| 53 | OCH₃, CH₃O—, O—CH₂ on cyclohexyl | —SO₂NHCH₂CH₃ | Do. |
| 54 | Cl, CH₃O—, O—CH₂ on cyclohexyl | —SO₂NH—C₆H₁₁ | Do. |
| 55 | Cl, CH₃O—, O—CH₂ on cyclohexyl | —SO₂NH—C₆H₄— | Do. |
| 56 | Br, Cl₃C—CH(O—)(O—CH)—cyclohexyl—, CCl₃ | —SO₂NHCH₃ | Do. |
| 57 | CH₃O—, O—CH₂ on cyclohexyl | —SO₂NH—C₆H₄—Cl | Do. |
| 58 | Same as above | —SO₂NH—C₆H₄—COOCH₃ | Do. |
| 59 | do | —SO₂NH—C₆H₄—OH | Do. |
| 60 | do | —SO₂NHCH₂CH=CH₂ | Do. |
| 61 | do | —SO₂NHCH₂CH₂N(CH₂—CH₂)₂O (morpholino) | Do. |
| 62 | do | —SO₂N(CH₂—CH₂)₂ (pyrrolidino) | Do. |
| 63 | do | —SO₂N(CH₂CH₂OCOCH₃)₂ | Do. |
| 64 | C₆H₅— | —SO₂NH—C₆H₃(O—CH(CH₃))(CH—O)(CH₃) | Do. |

| Example No. | A | R | Shade on polyester fibre |
|---|---|---|---|
| 65 | [cyclohexane with OCH₂/O-CH₂ dioxolane] | -SO₂-N(CH=CH)(CH₂-O) | Yellow. |
| 66 | C₆H₅- | -SO₂NH-[ring with Cl, O-CH₂, CH₂-O] | Do. |
| 67 | Same as above | -SO₂NH-[ring with OCH₃, O-CH₂, CH₂-O] | Do. |
| 68 | [cyclohexane] | -SO₂NH-[ring with O-CH₂, CH₂-O] | Do. |
| 69 | [ring with Cl] | Same as above | Do. |
| 70 | [ring with COOCH₃] | ...do... | Do. |
| 71 | [ring with O-CH₂, CH₂-O] | -Br | Do. |
| 72 | Same as above | -CO-[ring] | Do. |
| 73 | ...do... | -SO₂-[ring] | Do. |
| 74 | ...do... | -SO₂NHCH₂CH₂OH | Do. |
| 75 | ...do... | -SO₂NH-[ring]-Br | Do. |
| 76 | ...do... | -SO₂NH-[ring]-OCH₃ | Do. |
| 77 | ...do... | -SO₂NH-[ring]-NO₂ | Do. |
| 78 | ...do... | -SO₂NH-[ring]-CN | Do. |
| 79 | ...do... | -SO₂NH-[ring]-[ring] | Do. |
| 80 | ...do... | -SO₂NH-[ring]-O-[ring] | Do. |
| 81 | [ring]-O-[ring] | -SO₂NH-[ring with O-CH₂, CH₂-O] | Do. |
| 82 | CH₃CO-[ring] | Same as above | Do. |
| 83 | [ring]-O-[ring] | ...do... | Do. |

| Example No. | A | R | Shade on polyester fibre |
|---|---|---|---|
| 84 | 2,4-dichlorophenyl | do | Yellow. |
| 85 | 4-(phenyl-O-CO-)phenyl | do | Do. |
| 86 | 4-(phenyl-CO-)phenyl | do | Do. |
| 87 | 4-((CH₃)₂N-CO-)phenyl | do | Do. |
| 88 | 4-((N≡C-CH₂CH₂)₂N-CO-)phenyl | do | Do. |
| 89 | 4-((HOCH₂CH₂)₂NSO₂-)phenyl | do | Do. |
| 90 | C₆H₅- | -CONH-(3,4-methylenedioxyphenyl) | Do. |
| 91 | 4-(CN-)phenyl | Same as above | Do. |
| 92 | 3-chloro-4-methylphenyl | -SO₂NH-(3,4-methylenedioxyphenyl) | Do. |
| 93 | 4-(CH₃HNSO₂-)phenyl | Same as above | Do. |
| 94 | 4-(H₂N-CO-)phenyl | do | Do. |
| 95 | 4-(CH₃-CO-O-)phenyl | do | Do. |
| 96 | 3,4-methylenedioxyphenyl | -CONH-phenyl | Do. |
| 97 | do | -CONH-(phenyl-H) | Do. |
| 98 | do | -CONH-(4-chlorophenyl) | Do. |
| 99 | 3-nitrophenyl | -SO₂NH-(3,4-methylenedioxyphenyl) | Do. |
| 100 | 3-cyanophenyl | Same as above | Do. |
| 101 | 3-methoxyphenyl | do | Do. |
| 102 | 3-methylphenyl | do | Do. |
| 103 | 2,3-dichlorophenyl | do | Do. |

| Example No. | A | R | Shade on polyester fibre |
|---|---|---|---|
| 104 | $CH_3OCH_2CH_2CH_2NHSO$—⟨ ⟩— | —$SO_2NH$—⟨benzodioxole⟩— | Yellow |
| 105 | $ClCH_2SO$—⟨ ⟩— | Same as above | Do. |
| 106 | $BrCH_2SO_2$—⟨ ⟩— | do | Do. |
| 107 | ⟨ ⟩—$O$—$CH_2COO$—⟨ ⟩— | do | Do. |
| 108 | ⟨ ⟩—$CH_2CH_2SO_2$—⟨ ⟩— | do | Do. |
| 109 | $Cl$—⟨ ⟩—$CO$—$O$—⟨ ⟩— | do | Do. |
| 110 | ⟨ ⟩—$NHSO_2$—⟨ ⟩— | do | Do. |
| 111 | ⟨ ⟩—$CH_2SO_2$—⟨ ⟩— | do | Do. |
| 112 | ⟨benzodioxole⟩—$NHSO_2$—⟨ ⟩— | do | Do. |
| 113 | $O_2N$—⟨ ⟩—$CO$—$O$—⟨ ⟩— | do | Do. |
| 114 | $CN$—⟨ ⟩—$O$—$CO$—⟨ ⟩— | do | Do. |
| 115 | $CH_3$—⟨ ⟩—$O$—$CO$—⟨ ⟩— | do | Do. |
| 116 | ⟨ ⟩($CH_3$)—$O$—$CO$—⟨ ⟩— | do | Do. |
| 117 | $CH_3O$—⟨ ⟩—$O$—⟨ ⟩—$O$—$CO$—⟨ ⟩— | do | Do. |
| 118 | ⟨ ⟩—$O$—⟨ ⟩—$OCO$—⟨ ⟩— | do | Do. |
| 119 | ⟨ ⟩—⟨ ⟩($O$—$CO$—⟨ ⟩—) | do | Do. |
| 120 | $C_6H_5$— | —$SO_2NH$—⟨methylbenzodioxole (CH$_3$)⟩ | Do. |
| 121 | ⟨benzodioxole⟩— | —$SO_2NHCH_2CH_2Cl$ | Do. |
| 122 | Same as above | —$SO_2NHCH_2CH_2Br$ | Do. |
| 123 | do | —$SO_2NHCH_2CH_2O$—⟨ ⟩— | Do. |
| 124 | do | —$SO_2CH_2$—⟨ ⟩—$OCH_3$ | Do. |

Representative dyestuffs of the foregoing examples are as follows

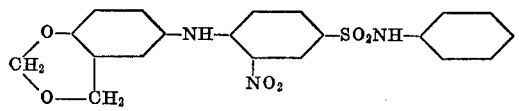

Example 1

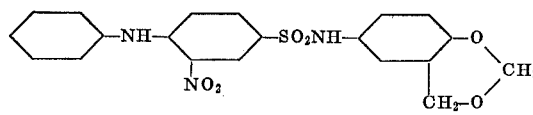

Example 2

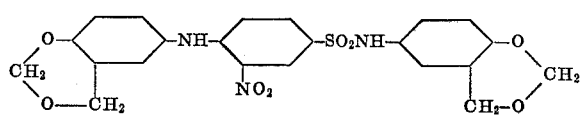

Example 3

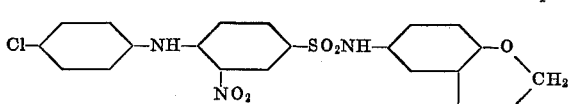

Example 41

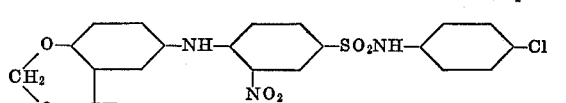

Example 57

Having thus discussed the invention, what I claim is:

1. Disperse dye free from sulphonic acid groups and of the formula

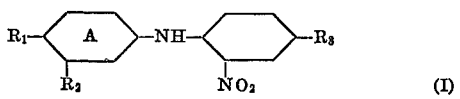
(I)

wherein $R_1$ is a hydrogen atom, halo, hydroxy, nitro, cyano, alkyl, alkoxy, phenoxy, acetoxy, phenoxyacetoxy, chlorobenzoyloxy, nitrobenzoyloxy, acyl, acylamino or, together with $R_2$, a bridge member of the formula

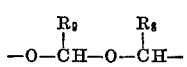

$R_2$ is a hydrogen atom, halo, cyano, nitro, alkyl, alkoxy, phenoxy, acyl, acylamino or, together with $R_1$, a bridge member of the formula

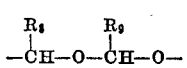

$R_3$ is halo, cyano, nitro, acyl or a radical of the formula

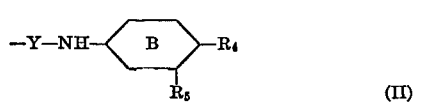
(II)

$R_4$ is a hydrogen atom, halo, alkyl, alkoxy, acylamino, alkoxycarbonyl or, together with $R_5$, a bridge member of the formula

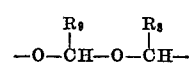

$R_5$ is a hydrogen atom or, together with $R_4$, a bridge member of the formula

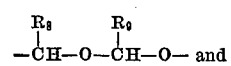 and each of $R_8$ and $R_9$ is, independently, a member selected from the group consisting of a hydrogen atom, alkyl, fluoroalkyl, chloroalkyl and bromoalkyl;

Y is —CO— or —SO$_2$—;

each acyl being of one of the formulae

R'—X— and R''—W— wherein

R' is phenyl or alkyl;

X is —O—CO— or —SO$_2$—;

R'' is a hydrogen atom, phenyl, alkyl or cyclohexyl;

W is —CO—, —NR'''—CO— or —NR''''—SO$_2$—;

R''' is a hydrogen atom, phenyl or alkyl;

each alkyl and each alkoxy containing 1, 2, 3 or 4 carbons; any further substituent on an alkyl or alkoxy being a member selected from the group consisting of halo, hydroxy, cyano, alkoxy, phenyl, phenoxy, acyl and acyloxy; any further substituent on a phenyl nucleus being a member selected from the group consisting of halo, hydroxy, alkyl, alkoxy, phenyl, phenoxy, cyano, nitro, acyl, acyloxy and acylamino; any further substituent on an amino nitrogen being alkyl or phenyl; and the dye containing at least one of the nuclei A and B substituted by a group of the formula

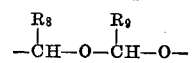

2. Disperse dye of the nitro series according to claim 1 and of the formula

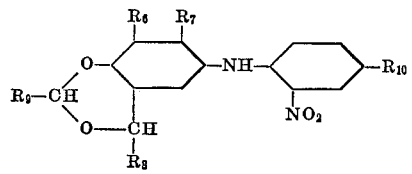
(III)

wherein $R_6$ is a hydrogen atom, chloro, bromo or alkyl;

$R_7$ is a hydrogen atom, chloro, bromo, alkyl or alkoxy; and $R_{10}$ is chloro, bromo, cyano, nitro, alkylcarbonyl, alkoxycarbonyl, benzoyl, aminocarbonyl, alkylsulphonyl, phenylsulphonyl or aminosulphonyl;

any further substituent on an alkyl being a member selected from the group consisting of chloro, bromo, hydroxy, alkoxy, phenyl, phenoxy and cyano; and any further substituent on a phenyl nucleus being a member selected from the group consisting of chloro, bromo, alkyl, alkoxy, nitro, cyano, acylamino, phenyl and phenoxy.

3. Disperse dye of the nitro series according to claim 1 and of the formula

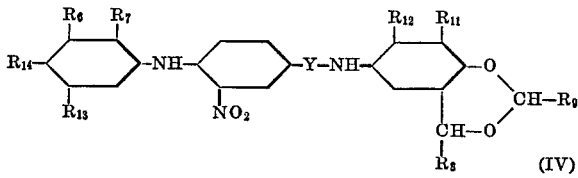
(IV)

wherein $R_{11}$ is a hydrogen atom, chloro, bromo, or alkyl;

$R_{12}$ is a hydrogen atom, chloro, bromo, alkyl or alkoxy;

$R_{13}$ is a hydrogen atom, halo, nitro, cyano, alkoxy, acylamino, alkoxycarbonyl or, together with $R_{14}$, a bridge member of the formula

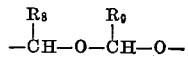

and $R_{14}$ is a hydrogen atom, cholro, bromo, hydroxy, alkyl, alkoxy, cyano, nitro, alkylcarbonyl, alkylsulphonyl, phenylmethylsulphonyl, phenylethylsulphonyl, alkoxycarbonyl, phenylcarbonyl, phenoxycarbonyl, aminocarbonyl, acylamino, aminosulphonyl or, together with $R_{13}$, a bridge member of the formula

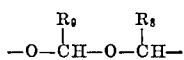

any further substituent on an alkyl being a member selected from the group consisting of cholro, bromo, hydroxy, alkoxy, phenoxy and cyano; and any further substituent on a phenyl nucleus being a member selected from the group consisting of halo, cyano, nitro, alkyl, alkoxy, phenyl and phenoxy.

4. Disperse dye of the nitro series according to claim 1 wherein $R_3$ is a radical of the formula

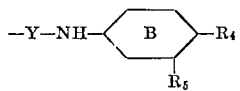

and Y is —$SO_2$—.

5. Disperse dye of the nitro series according to claim 1 wherein $R_3$ is a radical of the formula

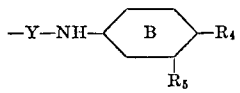

and Y is —CO—.

6. The dye according to claim 1 of the formula

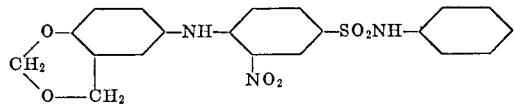

7. The dye according to claim 1 of the formula

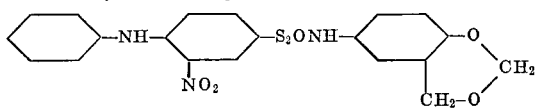

8. The dye according to claim 1 of the formula

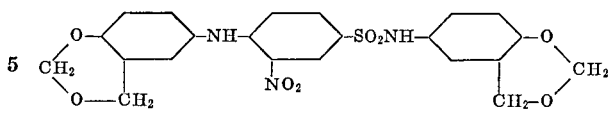

9. The dye according to claim 1 of the formula

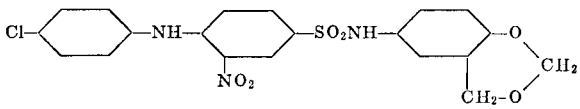

10. The dye according to claim 1 of the formula

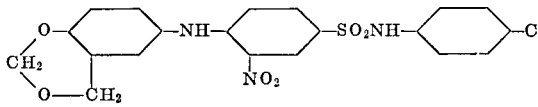

References Cited
UNITED STATES PATENTS

| | | | |
|---|---|---|---|
| 2,368,723 | 2/1945 | Olpin | 8—57 |
| 2,769,816 | 11/1956 | Kartinos | 260—340.3 |
| 2,866,678 | 12/1958 | Merian | 8—57 |
| 2,977,376 | 3/1961 | Merian | 260—397.7 |

HENRY R. JILES, Primary Examiner

C. M. SHURKO, Assistant Examiner

U.S. Cl. X.R.

8—178 R, 179, 180; 260—340.3

UNITED STATES PATENT OFFICE
CERTIFICATE OF CORRECTION

Patent No. 3,637,669          Dated   January 25, 1972

Inventor(s)  RUEDI ALTERMATT

It is certified that error appears in the above-identified patent and that said Letters Patent are hereby corrected as shown below:

Column 1, line 25, in the formula, "-$R_4$" should read -- -$R_3$--; "(I)" should read --(I),--; line 31, "of" should read --or--; line 37, after the formula, insert a comma --,--; line 44, after the formula, "(II)" should read --(II),--; lines 52 to 56, "Y ... acid groups." should read: --
Y for a group of the formula -CO- or -$SO_2$-; at least one of the nuclei A and B is substituted by a group of the formula -$CH_2$-O-$CH_2$-O- and the molecule may bear further substituents with the exception of sulphonic acids groups.--; line 61, "alkoxy" should read --alkoxy,--. Column 2, line 10, "-$SO_2$-" should read -- -$SO_2$-,--; line 27, "$R_9$" should read --$R_9$,--; line 34, "chorine" should read --chlorine--; line 37, "acylamino" should read --acylamino,--; line 56, in the formula, "$R_9$" (first occurence) should read --$R_8$--; line 63, "V;" should read --(V);--. Column 3, line 13, after the formula, "(VII" should read --(VII)--; line 15, "VI" should read --(VI)--; line 16, "VII" should read --(VII)--; line 24, "I" should read --(I)--; line 25, "II" should read --(II)--; line 39, "VI." should read --(VI).--; line 41, "I" should read --(I)--; line 42, "II" should read --(II)--; line 49, "VI," should read --(VI),--; line 57, "IX," should read --(IX),--. Column 4, line 18, start a new paragraph with "In the"; line 42, after the formula, insert a comma --,--. Column 8, Example 30, in the definition of R, delete "Cl". Column 9, Example 56, in the definition of A, "W" should read -- ... --. Column 12, Example 65, in the definition of R, "C-CH" should read --C-$CH_3$--; Example 67, in the definition of R, "$SO_2$NH-" should read -- -$SO_2$NH- --. Column 13, Example 103, "03" should read --103--. Column 15, Example 113, in the definition of A, "⌬-" should read -- ⌬ --. Column 17, line 32, "discussed" should

UNITED STATES PATENT OFFICE
CERTIFICATE OF CORRECTION

Patent No. 3,637,669                    Dated January 25, 1972

Inventor(s) RUEDI ALTERMATT

It is certified that error appears in the above-identified patent and that said Letters Patent are hereby corrected as shown below:

read --disclosed--; line 42, "chloro" should read --chloro- --; line 46, after the formula, insert a semicolon --;--; line 54, after the formula, insert a semicolon --;--; line 60, after the formula, "(II)" should read --(II),--; line 66, after the formula, insert a semicolon --;--; line 72, in the formula, "and" should read --; and--. Column 18, line 26, after the formula, insert a period --.--; line 70, after the formula, insert a semicolon --;--. Column 19, line 3, after the formula, insert a semicolon --;--; line 34, "-$SO_2$ONH-" should read -- -$SO_2$NH- --. line 20, "-C" should read -- -Cl--.

Signed and sealed this 6th day of March 1973.

(SEAL)
Attest:

EDWARD M. FLETCHER, JR.                 ROBERT GOTTSCHALK
Attesting Officer                       Commissioner of Patents